US012273988B2

(12) United States Patent
Ushiroda et al.

(10) Patent No.: US 12,273,988 B2
(45) Date of Patent: Apr. 8, 2025

(54) HIGH-POWER PLASMA TORCH WITH IGNITION DETUNING

(71) Applicant: Radom Corporation, West Allis, WI (US)

(72) Inventors: Kenshin Ushiroda, Milwaukee, WI (US); Cory Barthel, Pewaukee, WI (US); Ian McKinney, Mequon, WI (US); John Koller, Waukesha, WI (US); Jovan Jevtic, West Allis, WI (US)

(73) Assignee: Radom Corporation, West Allis, WI (US)

( * ) Notice: Subject to any disclaimer, the term of this patent is extended or adjusted under 35 U.S.C. 154(b) by 0 days.

(21) Appl. No.: 18/741,093

(22) Filed: Jun. 12, 2024

(65) Prior Publication Data

US 2024/0422890 A1 Dec. 19, 2024

Related U.S. Application Data

(60) Provisional application No. 63/521,219, filed on Jun. 15, 2023.

(51) Int. Cl.
*H05H 1/34* (2006.01)
*H05H 1/28* (2006.01)

(52) U.S. Cl.
CPC ............ *H05H 1/3478* (2021.05); *H05H 1/28* (2013.01); *H05H 1/3468* (2021.05)

(58) Field of Classification Search
CPC ........................... H05H 1/3478; H05H 1/3468
USPC ..................................................... 313/231.31
See application file for complete search history.

(56) References Cited

U.S. PATENT DOCUMENTS

| | | | | |
|---|---|---|---|---|
| 5,241,243 A * | 8/1993 | Cirri | H01J 37/32596 | 315/111.21 |
| 8,427,067 B2 * | 4/2013 | Espiau | H01J 65/046 | 315/248 |
| 9,491,841 B2 * | 11/2016 | Jevtic | G21B 1/057 | |
| 9,706,635 B2 * | 7/2017 | Jevtic | H01J 37/321 | |
| 9,763,287 B2 * | 9/2017 | Knox | C01B 32/225 | |
| 11,956,882 B2 | 4/2024 | Jevtic et al. | | |
| 2018/0332697 A1 * | 11/2018 | Bazargan | H05H 1/28 | |
| 2023/0276562 A1 * | 8/2023 | Jevtic | H05H 1/30 | 315/111.41 |

* cited by examiner

*Primary Examiner* — Christopher M Raabe
(74) *Attorney, Agent, or Firm* — Boyle Fredrickson, SC

(57) ABSTRACT

A high-powered microwave torch provides a tunable cavity to move between a first and second mode for ignition and steady-state operation. The tuning may be accomplished by adjusting end plates of a cylindrical cavity consistent with a desired TE01δ resonant mode. A swirl promoting spacer system allows cantilevered coaxial tubes to accommodate gas flow rates, and a junction between the tube assembly and a plasma nozzle provides a compression engagement resistant to temperature-expansion induced stress.

9 Claims, 4 Drawing Sheets

HIGH-POWER PLASMA TORCH WITH IGNITION DETUNING

CROSS REFERENCE TO RELATED APPLICATION

This application claims the benefit of U.S. provisional application 63/521,219 filed Jun. 15, 2023 and hereby incorporated by reference.

STATEMENT REGARDING FEDERALLY SPONSORED RESEARCH OR DEVELOPMENT

BACKGROUND OF THE INVENTION

The present invention relates to high-temperature plasma torches and in particular to a high-power plasma torch using a dielectric resonator.

Plasma torches, which produce a jet of high-temperature plasma, are used for cutting, plasma spraying, waste disposal, and the like. In a common design, a gas is passed through an electrical arc between electrodes which converts the gas into a jet of plasma. The electrodes of such systems are subject to erosion, especially at high power, and corrosion by the carrier gas.

U.S. Pat. No. 9,706,635 entitled: "Plasma generator using dielectric resonator" describes a plasma torch using an intense but non-arcing electrical field from a circumferentially excited dielectric resonator. Such an approach eliminates problems of electrode wear and contamination of the plasma from erosion of arc electrodes.

High-power microwave plasma torches are promising for the gasification of waste as they may provide greater power efficiency and reduce unwanted byproducts such as tar. Scaling up low-powered microwave torches (less than 20 kW) to these high-power levels (greater than 100 KW) requires higher gas flow rates and produces higher temperatures that fundamentally change the operating characteristics of the torch. Such torches can be difficult to ignite and produce elevated temperatures that can damage torch components.

SUMMARY OF THE INVENTION

The present inventors have determined that a difficulty in igniting high-powered plasma torches can be moderated by detuning the microwave cavity from its operating state during the ignition process. While the inventors do not wish to be bound by a particular theory, this tuning difference is believed to result from significant differences in plasma density between the time of ignition and subsequent steady-state operating conditions. To address this problem, the invention provides a rapidly tunable dielectric cavity permitting multiple frequency modes of operation tailored for ignition versus steady-state operation. In one embodiment, the tunable cavity uses adjustable end plates of a cylindrical chamber which operate to establish cavity boundary conditions without close electrical connection to the cylindrical cavity walls facilitating their rapid movement while providing robust frequency mode stability.

In other embodiments, the invention addresses problems of thermal expansion at high temperatures in attaching a high-temperature plasma nozzle tightly to a glass plasma tube through the use of a specially designed compression fitting and provides improved heat shielding using a closely spaced triaxial glass tube system that protects the dielectric elements yet avoids damaging mechanical resonances at the necessary high gas-flow rates.

Specifically, one embodiment of the invention provides a plasma torch having a microwave resonant cavity having electrically conductive side walls surrounding a cavity axis and at least one dielectric ring within the microwave resonant cavity providing a central opening extending along the cavity axis. A plasma tube extends along the cavity axis through the microwave resonant cavity and dielectric ring to allow passage of a plasma feeder gas along the axis and a waveguide communicating with the resonant cavity for conducting microwave energy from an energy source into the microwave cavity to establish a plasma within the plasma tube. A cavity tuner is provided that is adapted to reversibly change a resonant frequency of the cavity after ignition of the plasma by changing the cavity dimensions.

It is thus a feature of at least one embodiment of the invention to provide a dynamically tunable microwave cavity that may be used to de-tune the cavity from steady-state operation for ignition.

The microwave resonant cavity may have a resonant frequency of less than 1 GHz and the cavity tuner may provide a change in resonant frequency of at least 2%.

It is thus a feature of at least one embodiment of the invention to provide sufficient detuning for high-powered plasma torch ignition.

The microwave resonant cavity may be a cylindrical cavity adapted to receive microwave energy from the energy source to establish a $TE01\delta$ mode sustaining a plasma within the plasma tube, and the cavity axis may be a central axis of the cylinder.

It is thus a feature of at least one embodiment of the invention to provide a tunable cavity well adapted to an annular dielectric structure with an axial plasma tube.

The cavity tuner may include at least one conductive tuner plate extending perpendicularly to the cavity axis within the microwave resonant cavity to a periphery adjacent to the electrically conductive side walls and may provide a central opening allowing passage of the plasma tube therethrough, where the conductive tuner plate is along the cavity axis toward and away from the dielectric ring to change the cavity resonant frequency.

It is thus a feature of at least one embodiment of the invention to provide for a cavity detuning system providing well-behaved transitions of a $TE01\delta$ mode.

The cavity tuner may further include a second electrically conductive tuner plate extending perpendicular to the cylinder axis within the cylindrical microwave resonant cavity to a periphery adjacent to the electrically conductive side walls and providing a central opening allowing passage of the plasma tube therethrough, the second tuner plate movable along the cylinder axis toward and away from the dielectric ring changing the cavity resonant frequency wherein the second electrically conductive tuner plate is symmetrically opposed across the at least one dielectric ring with the electrically conductive tuner plate.

It is thus a feature of at least one embodiment of the invention to provide ample tuning range with minimal displacement of the physical components of the cavity tuner.

The cavity tuner may further include a tuner plate actuator communicating with the first and second electrically conductive tuner plates to move them equally in opposite directions to change the cavity dimensions.

It is thus a feature of at least one embodiment of the invention to promote an axial centering of the resonant mode of the cavity at a connection between the cavity and the waveguide.

The tuner plate actuator may provide a first and second cam plate rotatable about a cylinder axis adjacent, respectively, to the first and second electrically conductive tuner plates and include cam surfaces communicating by actuator links with the first and second actuator plates to move the first and second actuator plates axially with rotation of the actuator plates about the cylinder axis.

It is thus a feature of at least one embodiment of the invention to provide a simple and reliable actuation mechanism providing desired tandem plate movement.

The plasma torch may further include an electrically controlled actuator for adjusting the cavity tuner according to a control signal communicating with a control system providing a control signal to the electronic actuator to provide a first cavity dimension during ignition of the plasma torch and a second cavity dimension at steady-state operation of the plasma torch.

It is thus a feature of at least one embodiment of the invention to provide an automatic cavity tuning responsive to the plasma operating state.

In one embodiment, the invention provides a nozzle assembly positioned to receive plasma from the exit end of the glass plasma tube and to constrict the plasma passing through a nozzle of the nozzle assembly. A seal attaches the exit end of the glass plasma tube to the nozzle assembly by compression of a sealing surface radially inwardly around an outer periphery of the exit end of the glass tube.

It is thus a feature of at least one embodiment of the invention to provide a high-temperature seal between dissimilar materials that can accommodate different coefficients of expansion. The seal applies forces to the glass tube consistent with its greatest strength in circumferential compression.

The nozzle assembly may provide a channel adjacent to the outer periphery of the exit end of the plasma tube having a channel wall spaced away from and facing the outer periphery of the glass plasma tube to retain a gasket material against outward radial movement, the gasket material providing the sealing surface. In this case, the nozzle assembly may provide an axially movable compression element adapted to axially compress the gasket material in the channel so that the gasket material expands radially to seal against the outer surface of the glass tube.

It is thus a feature of at least one embodiment of the invention to provide a simple method of pressing the gasket material against the outer surface of the glass tube.

The plasma torch may be a quartz glass or alumina ceramics and the gasket material may be carbon fiber, woven graphite, ceramic, mineral, or high temperature packing material.

It is thus a feature of at least one embodiment of the invention to employ well-characterized quartz glass using a readily available gasket material that can accommodate high temperatures.

The nozzle may be a non-glass material having an internal water cooling channel for conducting water around the axis.

It is thus a feature of at least one embodiment of the invention to construct the nozzle from a material amenable to the construction of internal water cooling channels and water cooling, different from the plasma tube, while avoiding sealing problems between dissimilar materials.

The nozzle may further include cooling fins extending radially into the water channel away from the axis.

It is thus a feature of at least one embodiment of the invention to provide a nozzle material and construction having greater heat resistance and removal capacities than could be obtained in a monolithic structure.

In one embodiment, a plasma tube assembly may be provided extending along the cylinder axis through the microwave resonant cavity and dielectric ring, the glass plasma tube assembly providing a central glass tube adapted to receive a plasma feeder gas along the cylinder axis to support a microwave generated plasma within the central glass tube, and an outer coaxial glass tube conducting a cooling gas in a cooling space between the outer coaxial glass tube and the central glass tube separate from the plasma feeder gas. A swirl chamber communicates with a first end of the outer coaxial glass tube and receives cooling gas at an angle to the axis to impart a helical trajectory of cooling gas through the cooling space having a helix sense being clockwise or counterclockwise. A tube spacer fits in the cooling space at a location removed from the first end of the central glass tube and communicates between the outer coaxial glass tube and the central glass tube by spaced apart struts separated by openings, the struts and openings cooperating to impart a helical trajectory of the cooling gas to the cooling space having the same helix sense as the swirl chamber.

It is thus a feature of at least one embodiment of the invention to prevent the occurrence of damaging resonant vibrations of the cantilevered end of the central glass tube at high gas-flow rates necessary for high-powered torches while preserving the necessary swirl of the gases. The inventors have determined that helix-inducing struts can overcome the incidental turbulence created by the spacer.

The helical trajectory of the gas from the swirl chamber may have a pitch matching the helical trajectory of the cooling gas through the tube spacer at the location of the spacer.

It is thus a feature of at least one embodiment of the invention to provide a reinforcement of established swirl from the swirl chamber.

In one embodiment, the plasma tube assembly may include a second outer coaxial glass tube surrounding the outer coaxial glass tube conducting a cooling gas separate from the plasma feeder gas in a second cooling space between the outer coaxial glass tube and second outer glass tube.

It is thus a feature of at least one embodiment of the invention to provide a method of handling much higher heat flux density in the plasma using existing tube materials and construction techniques.

The second outer coaxial glass tube and the outer coaxial glass tube may be separated by a radial dimension of less than 2 mm.

It is thus a feature of at least one embodiment of the invention to protect the dielectric assembly outside of the plasma tube without detrimentally separating the dielectric elements from the plasma being generated. The inventors have determined that even a small space with forced air can provide the necessary additional cooling.

These particular objects and advantages may apply to only some embodiments falling within the claims and thus do not define the scope of the invention.

DETAILED DESCRIPTION OF THE PREFERRED EMBODIMENT

Figure 1:
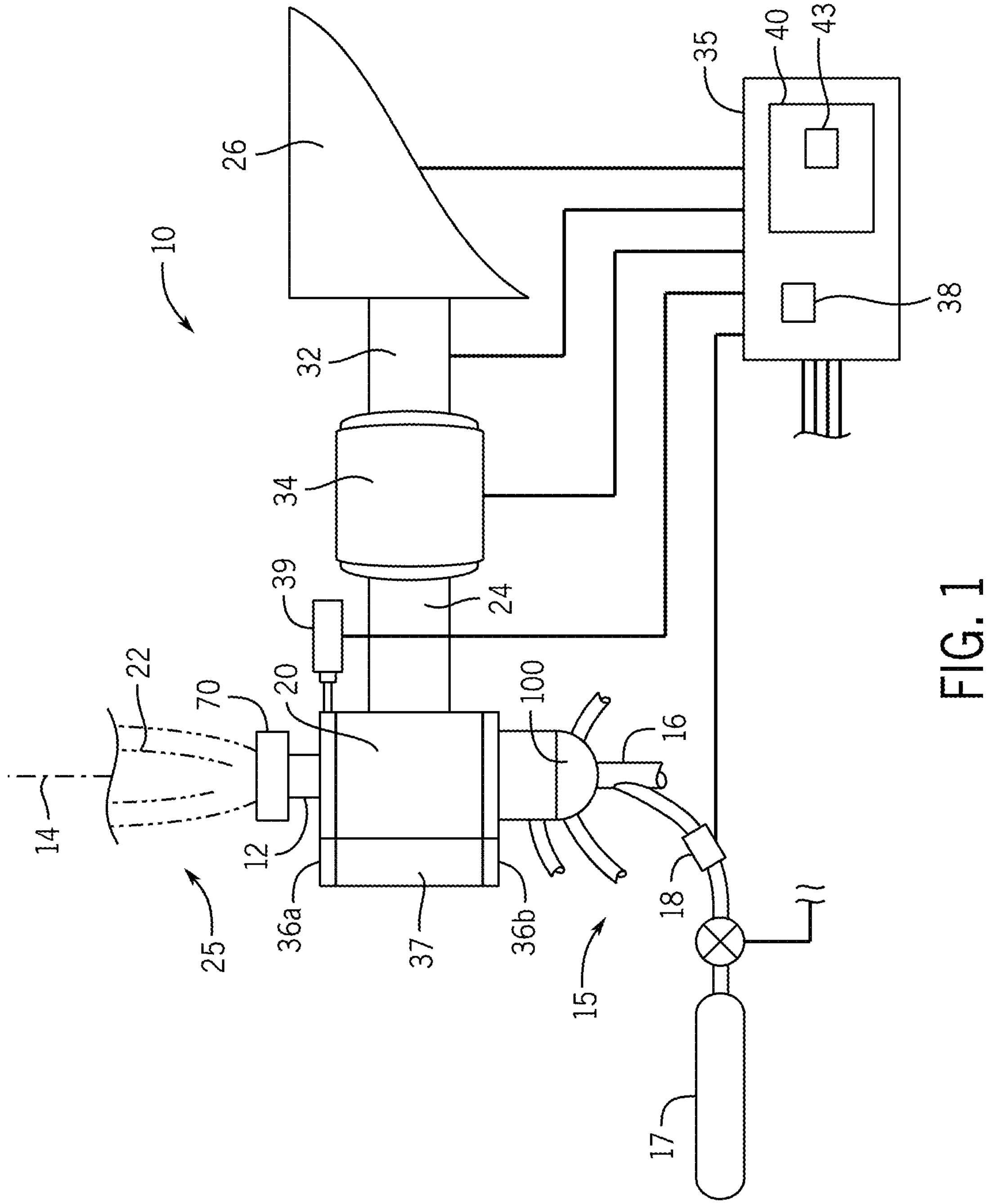
FIG. 1 is a side elevational view of a high-powered plasma torch system constructed according to one embodiment of the invention showing a cavity tuner assembly for tuning a torch cavity and a swirl manifold for introducing air into a plasma tube assembly.

Referring now to FIG. 1, a plasma torch 10 may provide a plasma tube 12 having a central lumen and extending along a torch axis 14. In some embodiments, the plasma tube 12 may be a high-temperature glass material, such as a fused quartz glass or low thermal expansion borosilicate glass or ceramic material such as alumina or boron nitride, to withstand high temperatures of plasma that will be generated within the plasma tube 12.

The plasma tube 12 communicates at an inlet side 15 with a source of plasma feeder gas 16, for example, initially providing argon or the like and then transitioning to a single molecular gas or a mixture of molecular gases, such as nitrogen, carbon-dioxide, steam, methane, or air. Before being received by the plasma tube 12, a feeder gas 16 of argon 17 may pass through a spark unit 18 providing a high-voltage electrode imparting an initial ionization of the feeder gas 16 received by the plasma tube 12.

The plasma tube 12 extends from an inlet side 15 along the axis 14 through a waveguide cavity 20 operating to expose the feeder gas 16 in the plasma tube 12 to an intense alternating electrical field stripping the electrons from the gas to create the plasma state. The resulting plasma 22 may exit the plasma tube 12 at an exit side 25 as a driven by the flow of the feeder gas 16.

The waveguide cavity 20 communicates through an input arm 24, extending perpendicularly from the axis 14, with a microwave generator 26. The microwave generator 26 provides a source of high-frequency microwave energy, for example, at the ISM frequency bands centered around 430 MHz, 915 MHz, and 2450 MHz, and power between 10 kW and 125 kW. Microwaves from the microwave generator 26 may be produced by a magnetron and may then pass through a stub tuner 34 of conventional design to match the microwave generator 26 to the cavity 20. A bidirectional power meter 32 measuring input energy from the microwave generator 26 and reflected energy from the waveguide cavity 20 allows assessment of impedance matching between the microwave generator 26 and the waveguide cavity 20. This impedance may be adjusted in part using the stub tuner 34 to maximize transfer of power from the microwave generator 26 to the waveguide cavity 20.

A waveguide cavity 20 suitable for use with the present invention may follow the teachings of U.S. patent application Ser. No. 17/652,839, assigned to the assignees of the present invention and hereby incorporated by reference.

The top and bottom of the waveguide cavity 20, oriented as depicted in FIG. 1, may be flanked by cam plates **36*a* and 36*b* rotatable about the axis 14 by means of an interconnecting handle 37 and/or an electronically controlled actuator 39**, the latter, for example, being a linear motor or pneumatic actuator with an electrically controllable valve or the like whose operation will be described in more detail below.

Control signals for the microwave generator 26, the bidirectional power meter 32, the stub tuner 34, the spark unit 18, the actuator 39 and various other pumps and valves implicit in their interoperation, may be exchanged with a plasma arc controller 35, for example, having a processor 38 and electronic memory 40 storing a stored program 43 for automatic or semiautomatic operation of the plasma torch 10 as will be described below.

Figure 2:
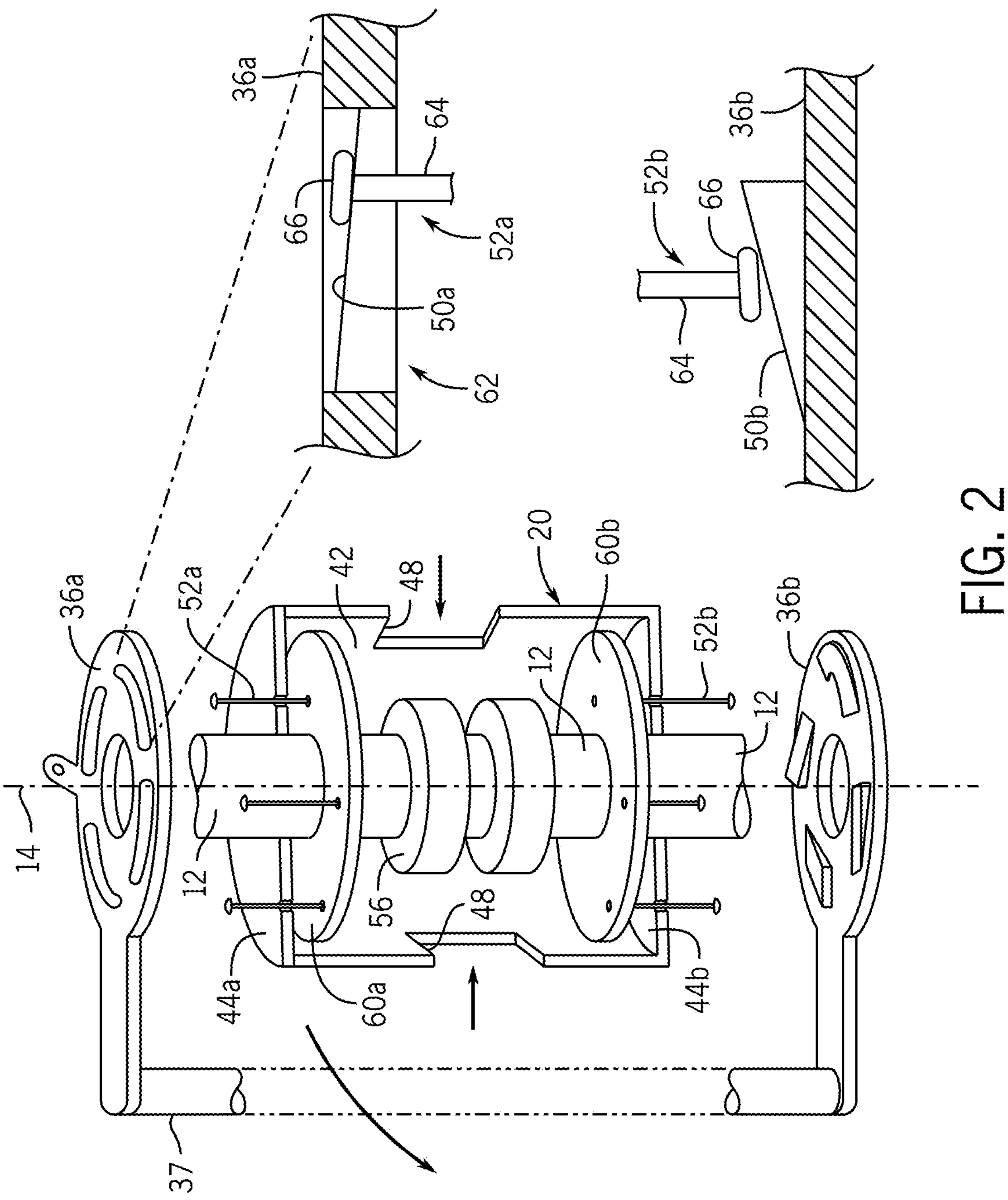
FIG. 2 is an exploded fragmentary view in partial cross section of the cavity tuner assembly of FIG. 1 showing upper and lower cam plates for moving cavity end plates in and out to change the cavity tuning and providing, as cross-sectional details, cross-sections of ramp portions of the cam plates.

Referring now to FIG. 2, the waveguide cavity 20 may provide for generally cylindrical side walls 42 radially symmetric about the axis 14 and capped at the top and bottom with an upper circular end plate **44*a* and a lower circular end plate 44*b* enclosing an internal cavity volume. The side walls 42 are breached by opposed microwave entrance openings 48** to receive microwave energy therethrough with a relative 180° phase shift between the electrical polarization of the radiofrequency energy.

Centered within the waveguide cavity 20 about the axis 14 and plasma tube 12 are one or more dielectric resonators 56 each being, in one embodiment, an annular ring of dielectric material symmetric and coaxially about the axis 14. As so positioned, the electrical field polarities of microwave electrical energy from each of the openings **48*a* and 48*b* induce opposite currents on opposite sides of the dielectric resonator 56 to promote cyclic current flow about the axis 14** therethrough at the frequency of the radiofrequency energy and consistent with a TE01δ resonant mode. The process of generating plasma through a concentrated yet highly uniform electrical field within a dielectric resonator is described in more detail in U.S. Pat. Nos. 9,706,635 and 9,491,841, assigned to the assignee of the present application and cited above and hereby incorporated by reference.

The material of the dielectric resonator 56 desirably has any one or more of the qualities of: a quality factor of greater than 100, an electrical resistivity greater than $1\times10^{10}$ Ωcm, a dielectric constant with a loss tangent of less than 0.01, and a dielectric constant (relative permittivity) greater than five. It will be appreciated that an arbitrary number of dielectric resonators may be arrayed along the plasma tube 12 with corresponding increases in the height of the cavity 20, for example, when higher power plasma torches are required.

Referring still to FIG. 2, each of the cam plates **36*a* and 36*b* may present upwardly facing cam ramps 50*a* and 50*b*, respectively, communicating, respectively, with actuator pins 52*a* and 52*b* to move the actuator pins 52 vertically in opposite directions with coordinated rotation of the cam plates 36*a* and 36*b* about axis 14. In this regard, cam plate 36*a* may provide for slots 62 through which shafts 64 of the actuator pin 52*a* may pass downwardly, with a head 66 of the actuator pin 52*a* riding on the upper surface of the cam ramps 50*a* on opposite sides of the slot 62. In contrast, cam plate 36*b* may provide an upwardly extending cam ramp 50*b* engaging a lower surface of a head 66 of the actuator pin 52*b*, with the shaft 64 of the actuator pin 52*b* extending upward therefrom. The slope of the cam ramp 50*a* will be opposite to that of cam ramp 50*b* as one moves in a given direction around the cam plates 36 so that the actuator pins 52*a* and 52*b* move vertically in opposite directions with a given rotation of the cam plates 36**.

The axial elevation of the cam ramps 50 may be a linear function of circumferential angle around the axis 14 or may be given a varying slope, for example, to provide finer tuning over portions of the angular range or to control a mapping between rotational position and tuning frequency such as may be developed analytically or empirically.

The shafts 64 of actuator pins 52*a* pass downward through corresponding openings in the end plate 44*a* to connect with a tuning disk 60*a* fitting within the cavity 20, while the shafts 64 of the actuator pins 52*b* pass upward through corresponding openings in the end plate 44*b* to connect with a corresponding tuning disk 60*b* fitting within the cavity 20. Each of the tuning disks 60*a* and 60*b* is electrically conductive and extends radially generally in a direction perpendicular to axis 14 to a periphery in close proximity to the side walls 42 but need not touch the side walls 42 so long as the periphery is within a distance of approximately one wavelength of the microwave energy conducted into the cavity 20.

From this description it will be appreciated that a clockwise rotation of the cam plates 36*a* and 36*b* (viewed downwardly) will cause disks 60*a* and 60*b* to move inward away from the end plates 44*a* and 44*b* toward the dielectric resonators 56, and counterclockwise rotation of the cam plates 36*a* and 36*b* will cause an opposite motion. This change in dimension of the cavity 20 thus allows a change in cavity tuning, for example, by as much as 5.5 percent or from frequency of 875 MHz to frequency of 925 MHz.

During the ignition phase of operation of the torch 10, the cam plates 36*a* and 36*b* will be rotated by control of the actuator 39 to decrease the distance between the tuning disks 60*a* and 60*b* with the effect of increasing the resonant frequency of the cavity 20 until it approaches the frequency generated by the magnetron of microwave source 26. After ignition, when a high-temperature plasma is formed, greatly increasing the temperature of the gas within the plasma tube 12 and increasing its electrical conductivity, the cam plates 36*a* and 36*b* are rotated to increase the distance between tuning disks 60*a* and 60*b* in order to compensate for the increase in resonant frequency of the cavity due to the conducting plasma. This may be done automatically by the controller 35, for example, controlling the ignition process and monitoring time, temperature and/or reflected power.

Figure 3:
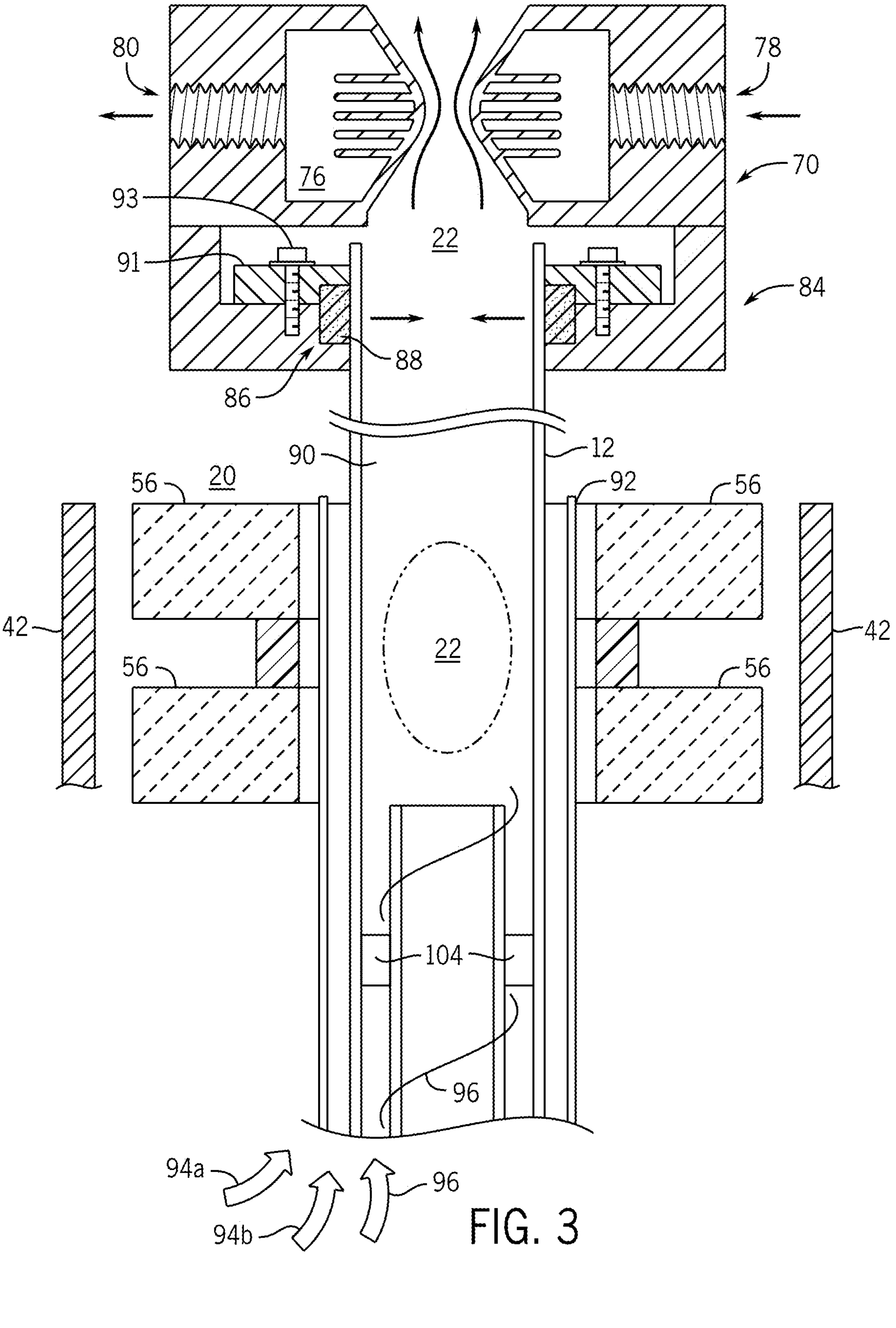
FIG. 3 is a fragmentary elevational cross-section through the torch of FIG. 1 showing a plasma nozzle attached to an outer quartz tube of the tube assembly and a swirl reinforcing tube spacer for preventing damaging mechanical resonances.

Referring now to FIGS. 1, 2 and 3, the plasma tube 12 may extend upwardly and downwardly through center openings in the tuning disks 60*a* and 60*b*, the end plates 44*a* and 44*b*, and the cam plates 36. The upper end of the plasma tube 12 may be received by a nozzle assembly 70 providing a water cooled nozzle channel 72 extending along the axis 14. The nozzle channel 72 has a lower inlet substantially equal to the inner diameter of the plasma tube 12, passing upwardly through a constricted portion 74 to an upper outlet of larger dimension than the constricted portion 74.

A circumferential water passage 76 passes outside and around the nozzle channel 72 to receive water as may enter a first radially extending inlet 78 to pass along a bifurcated path to a radially directed outlet 80 opposed across the axis 14 from the inlet 78. An inner wall of the circumferential water passage 76 adjacent to the nozzle channel 72 may have radially outwardly extending heat transfer fingers 82 allowing circumferential flow of water therethrough to improve the heat conduction from plasma 22 passing along the nozzle channel 72 into the water in the circumferential water passage 76.

The nozzle assembly 70 may be constructed of a ceramic material or a metal material generally having a substantially different coefficient of expansion than the plasma tube 12. In order to seal the nozzle assembly 70 to the upper end of the plasma tube 12, the nozzle assembly 70 may be attached to a seal 84 (for example, by machine screws not shown) providing an inner bore aligned with axis 14 and substantially equal to the outer diameter of the plasma tube 12 to fit over the plasma tube 12. The seal assembly 84 provides a circumferential channel 86 constrained on its radially outward side and open on its radially inward side to an outer wall of the plasma tube 12. A high temperature packing material 88, for example, a graphite packing material, is pressed into the channel 86 and compressed downwardly by a compression ring 91, for example, drawn downwardly by machine screws 93. Other gasket materials including carbon fiber, woven ceramic and mineral materials are also contemplated.

Compression ring 91 compresses the vertical dimensions of the packing material 88 that is constrained in all directions except inwardly toward the plasma tube 12 by the channel 86 and the compression ring 91. This downward compression causes the packing material 88 to expand inwardly against the outer circumference of the plasma tube 12 to provide a radially inward sealing force equalized by the elasticity of the packing material 88 so that the scaling force produces a circumferential compression to the glass material of the plasma tube 12 against which it is highly resistant.

The dielectric resonators 56 within the cavity 20 are protected from the extremely high temperatures of plasma 22 within the plasma tube 12 by means of a triaxial tube construction in which a central tube 90 is coaxially fit within the plasma tube 12 and an outer tube 92 coaxially fit around the plasma tube 12 in the region of the dielectric resonator 56. Forced cooling air 94*a* is provided between the dielectric resonator 56 and the outer surface of the outer tube 92 and forced cooling air 94*b* is provided between the inner surface of the outer tube 92 and the outer surface of the plasma tube 12 scavenging heat that would otherwise pass from the plasma 22 to the dielectric resonators 56 and their support structure. The outer tube 92 serves as a thermal barrier between the colder cooling air 94*a* and hotter cooling air 94*b*. The separation between the inner surface of the outer tube 92 and the outer surface of the plasma tube 12 may be less than 2 mm and typically less than 1 mm to preserve efficiency in the plasma generation.

Figure 4:
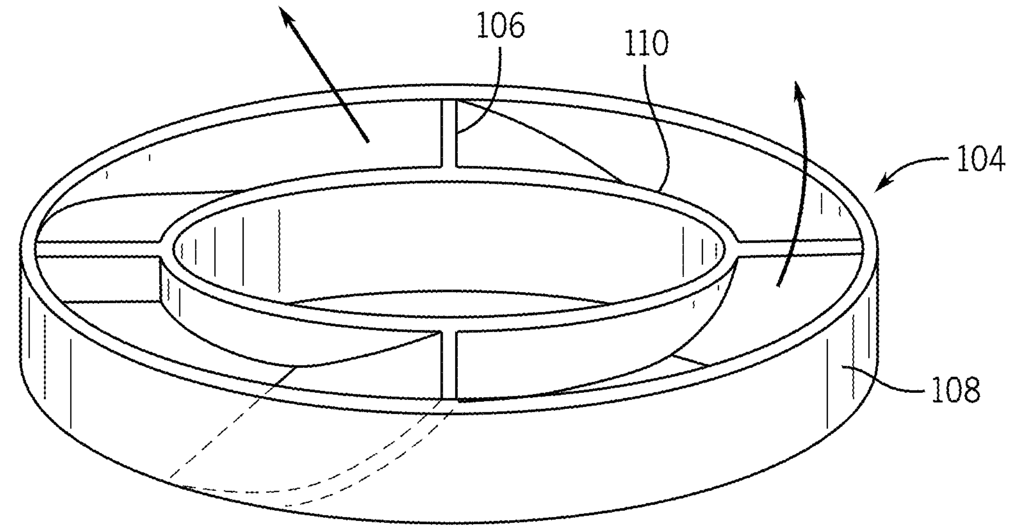
FIG. 4 is a perspective view of the swirl preserving tube spacer of FIG. 5.
Figure 5:
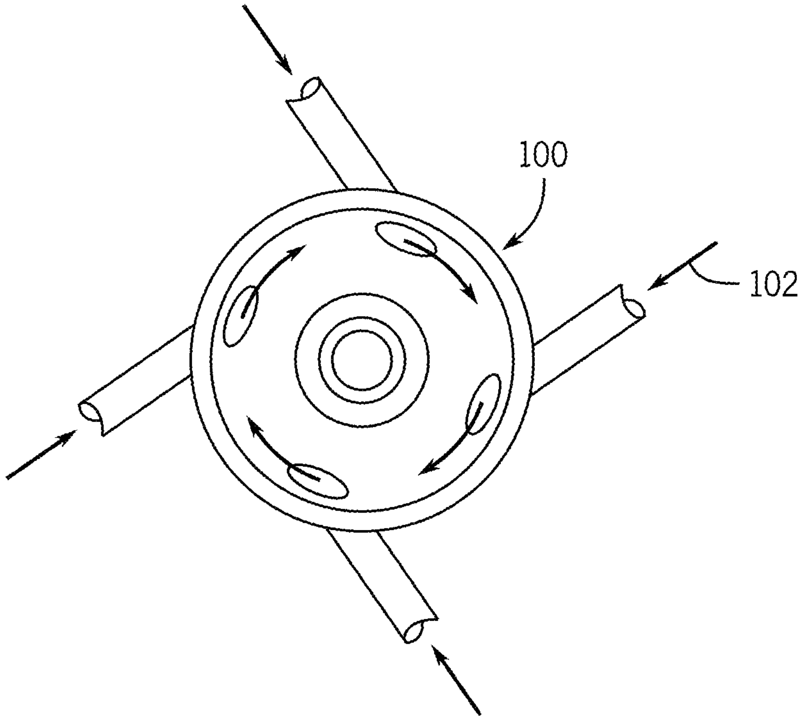
FIG. 5 is a cross-sectional plan view of the swirl manifold of claim 1 viewed upward through the tube assembly.

Referring now to FIGS. 1, 4, and 5, swirled air 96 is provided between the plasma tube 12 and the inner tube 90 serving both to draw heat emitted from the plasma 22 away from the dielectric resonator 56 but also to create a helical vortex above the termination of the inner tube 90 that serves to draw the cooler, denser air outwardly toward the plasma tube 12 displacing the hotter plasma gases to a central channel. The swirling may be provided by a swirl chamber 100 receiving cooling air 102 tangentially to the chamber volume and axis 14 to provide a necessary rotational momentum that is carried through the length of the plasma tube 12.

A spacer 104 may be fit between the outer walls of the inner tube 90 and the inner wall of the plasma tube 12 near their upper end to allow high velocity swirling air to pass therebetween while inhibiting any destructive resonance in the cantilevered inner tube 90. Disruption of this swirling air is minimized by minimizing the cross-sectional area of struts 106 extending radially between an outer ring 108 of the spacer 104 adjacent to the inner surface of the plasma tube 12 and an inner ring 110 of the spacer 104 adjacent to an outer surface of the inner tube 90, for example, to provide at least 75% of this cross-sectional area be open. The struts 106 are generally planar having a thickness of less than 2 mm with their planes tipped to align edgewise with the pitch of the swirled air 96 produced by the swirl chamber 100 minimizing their cross-sectional resistance and reinforcing the helical pitch of the swirling air against turbulence that might otherwise be caused by the spacer 104. The pitch promoted by the struts 106 will be identical with respect to its helical sense of clockwise or counterclockwise and angled to the axis 14 as that produced by the swirl chamber 100. The number of fins may be minimized, for example, to be four or less.

The term "cylindrical cavity" should be understood to include cavities that functionally act like a perfect cylindrical cavity to support a TE011 or TE01δ mode with respect to the axis of symmetry of the cylinder.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" arc intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What we claim is:

1. A plasma torch comprising:

a microwave resonant cavity having electrically conductive side walls surrounding a cavity axis;

at least one dielectric ring within the microwave resonant cavity providing a central opening extending along the cavity axis;

a plasma tube extending along the cavity axis through the microwave resonant cavity and dielectric ring to allow passage of a plasma feeder gas along the axis;

a waveguide communicating with the resonant cavity for conducting microwave energy from an energy source into the microwave cavity to establish a plasma within the plasma tube; and a cavity tuner adapted to reversibly change a resonant frequency of the cavity after ignition of the plasma by changing the cavity dimensions.

2. The plasma torch of claim 1 wherein the microwave resonant cavity has a resonant frequency of less than 1 GHz and the cavity tuner provides a change in resonant frequency of at least 2%.

3. The plasma torch of claim 1 wherein the microwave resonant cavity is a cylindrical cavity adapted to receive microwave energy from the energy source to establish a TE01δ mode sustaining a plasma within the plasma tube, and the cavity axis is a central axis of the cylindrical cavity.

4. The plasma torch of claim 3 wherein the cavity tuner is at least one conductive tuner plate extending perpendicularly to the cavity axis within the microwave resonant cavity to a periphery adjacent to the electrically conductive side walls and providing a central opening allowing passage of the plasma tube therethrough, the at least one conductive tuner plate movable along the cavity axis toward and away from the dielectric ring to change the cavity resonant frequency.

5. The plasma torch of claim 4 further including a second electrically conductive tuner plate extending perpendicular to the cylinder axis within the cylindrical microwave resonant cavity to a periphery adjacent to the electrically conductive side walls and providing a central opening allowing passage of the plasma tube therethrough and movable along the cavity axis toward and away from the dielectric ring changing the cavity resonant frequency; and wherein the second electrically conductive tuner plate is symmetrically opposed across the at least one dielectric ring with the electrically conductive tuner plate.

6. The plasma torch of claim 5 further including a tuner plate actuator communicating with the electrically conductive tuner plate and second electrically conductor tuner plates to move them equally in opposite directions to change the cavity dimensions.

7. The plasma torch of claim 6 wherein the tuner plate actuator provides a first and second cam plate rotatable about a cylinder axis adjacent, respectively, to the electrically conductive tuner plate and the second electrically conductive tuner plate and including cam surfaces communicating by actuator links with the electrically conductive tuner plate and second electrically conductive tuner plate to move the electrically conductive tuner plate and second electrically conductive tuner plate axially with rotation of the actuator plates about the cylinder axis.

8. The plasma torch of claim 1 further including an electrically controlled actuator for adjusting the cavity tuner according to a control signal; and a control system providing a control signal to the electrically controlled actuator to provide a first cavity dimension during ignition of the plasma torch and a second cavity dimension at a steady-state operation of the plasma torch.

9. The plasma torch of claim 1 further including a microwave energy source communicating with the waveguide to provide in excess of 100 kW of power.

* * * * *